Dec. 26, 1939.　　　F. W. SEYBOLD　　　2,184,898
COMPOSING ROOM SAW
Filed May 21, 1936　　　4 Sheets-Sheet 1
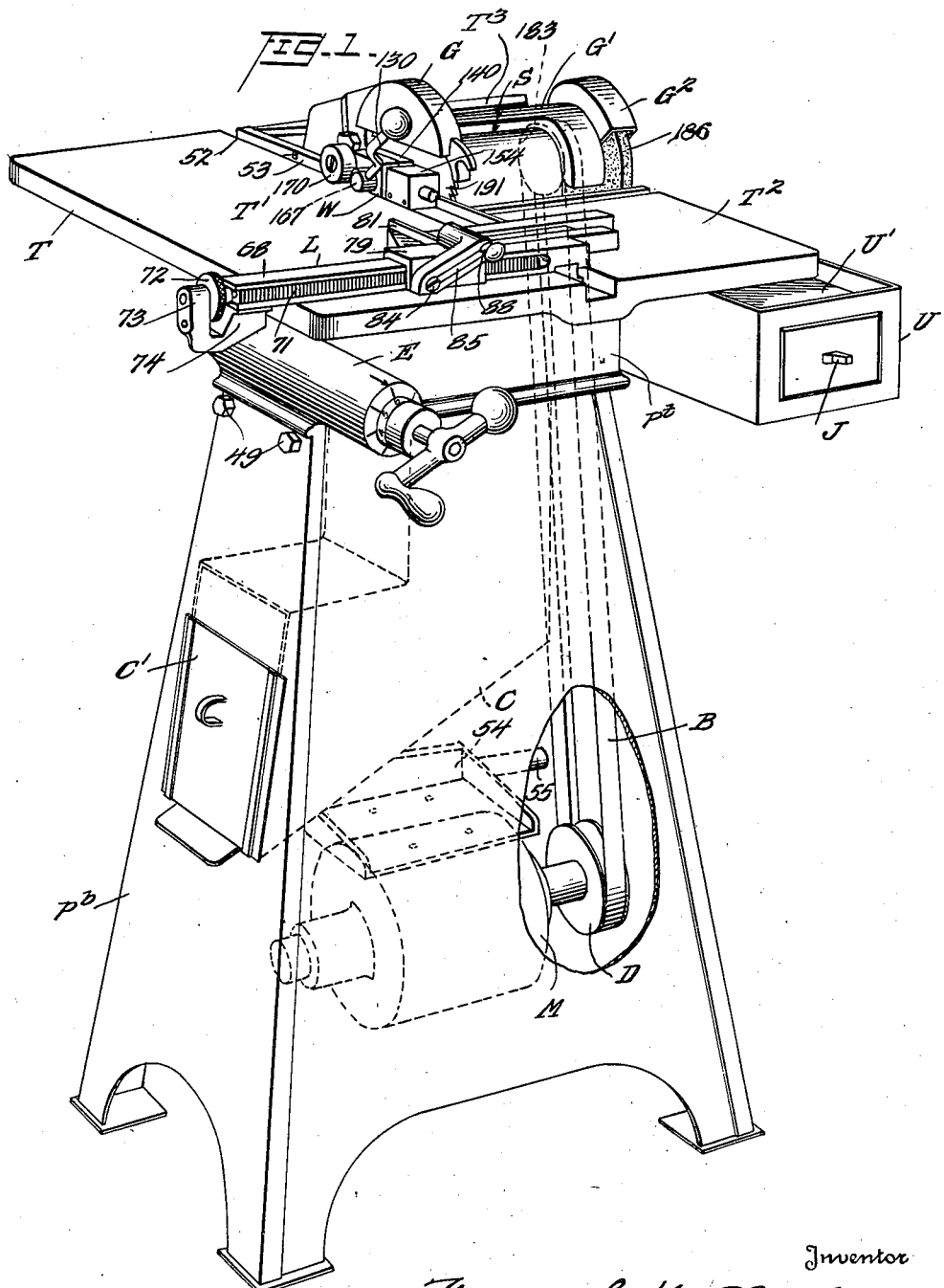

Dec. 26, 1939.　　　F. W. SEYBOLD　　　2,184,898
COMPOSING ROOM SAW
Filed May 21, 1936　　　4 Sheets-Sheet 2
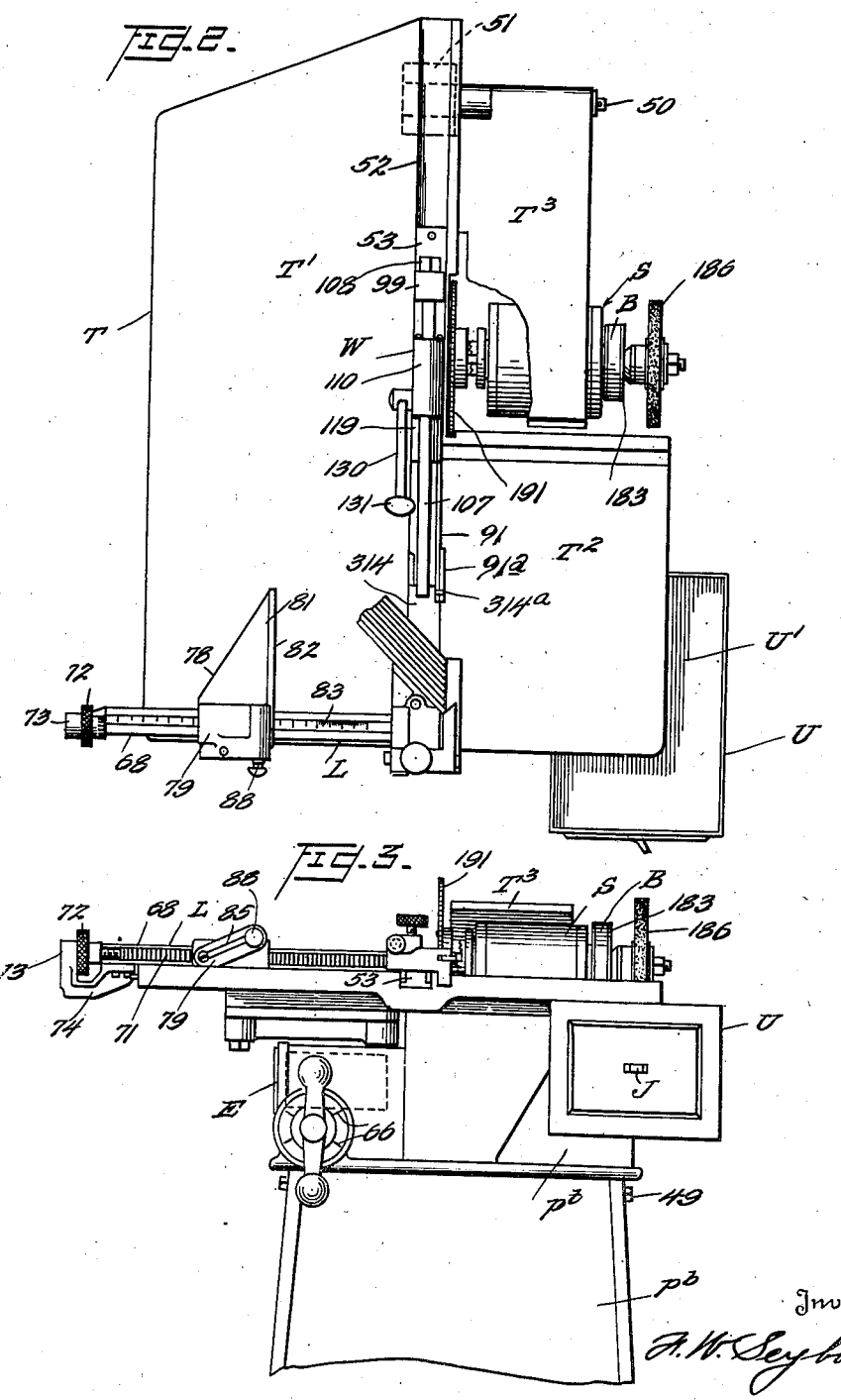

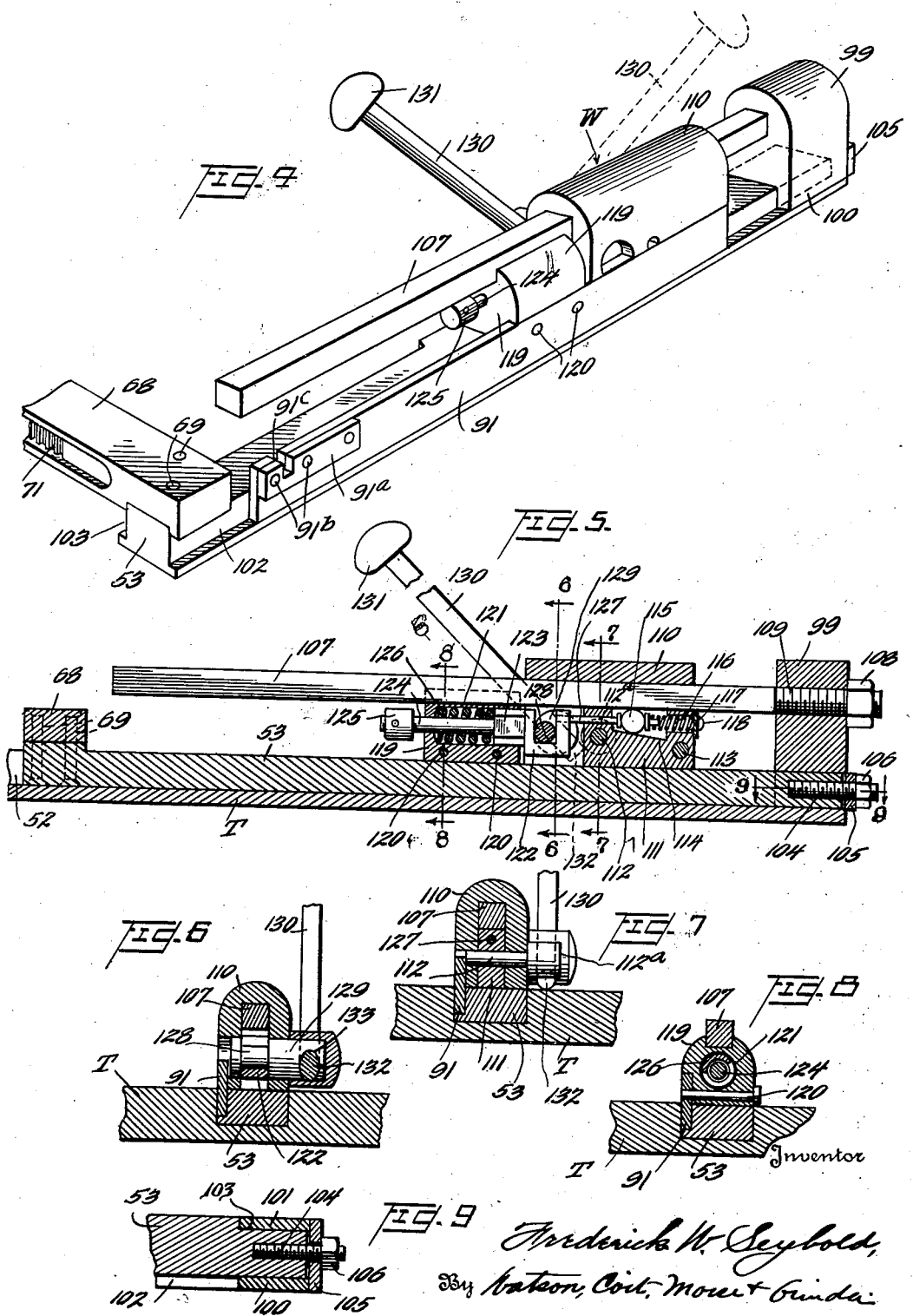

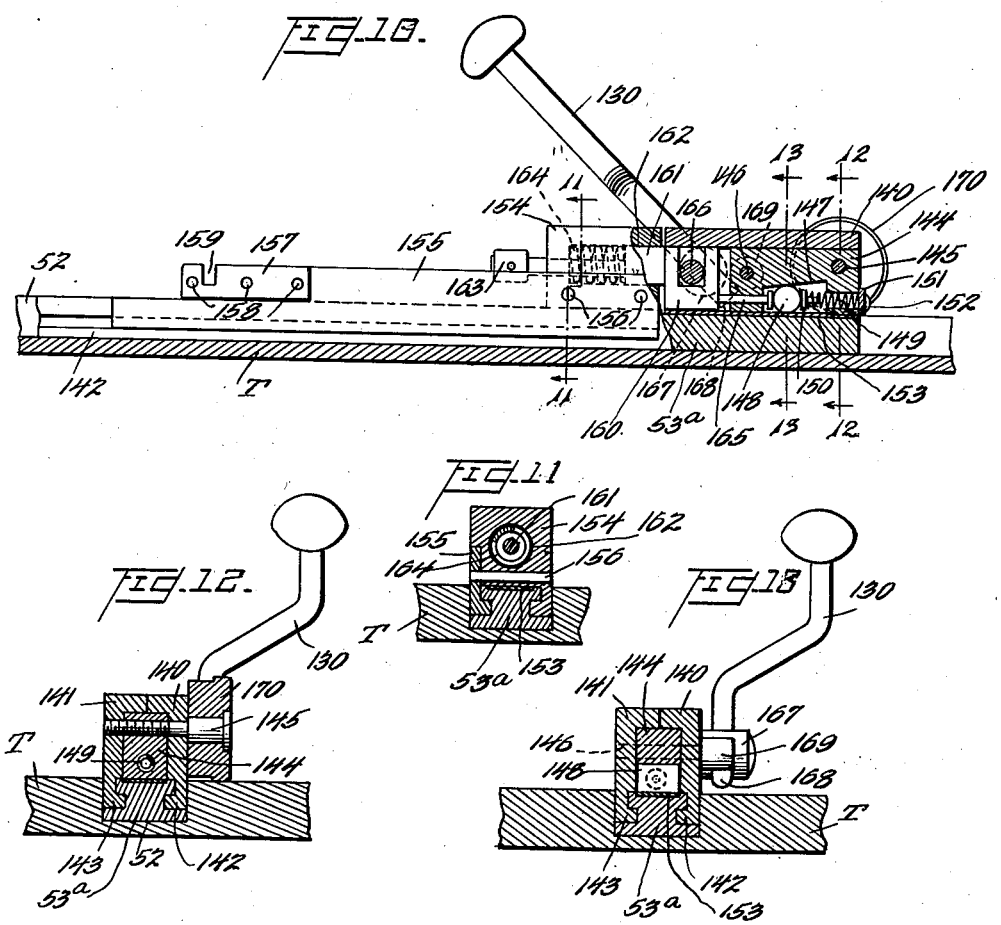

Patented Dec. 26, 1939

2,184,898

UNITED STATES PATENT OFFICE 2,184,898

COMPOSING ROOM SAW

Frederick W. Seybold, Westfield, N. J., assignor to American Type Founders, Incorporated, Elizabeth, N. J., a corporation of New Jersey Application May 21, 1936, Serial No. 81,069

6 Claims. (Cl. 29—69)

The present invention relates to metal saws and more particularly to composing room saws.

It is the principal object of the present invention to provide an improved work-holding clamp which is adapted to cooperate with the various gauging devices to present the work to the saw or other cutting devices, the clamp being easily manipulated to positively hold the work against the face of one of the gauges and not being dependent upon racks or gear teeth for its operation.

Other objects and features of novelty will be apparent from the description taken in connection with the drawings in which Fig. 1 is a perspective view of a machine constructed in accordance with this invention, the same being shown as adjusted to cut the work to a definite length and the work clamp being shown more in detail in Fig. 13;

Fig. 2 is a plan view of the machine as adjusted to miter one end of a series of metal rules, the work clamp being that shown in Figs. 7 and 8;

Fig. 3 is a front elevation of the machine as illustrated in Fig. 2;

Fig. 4 is a perspective view of the work holding clamp and associated parts;

Fig. 5 is a sectional elevation taken lengthwise of the device shown in Fig. 4 and looking toward the left;

Fig. 6 is a sectional elevation taken on the line 6—6 of Fig. 5 and looking in the direction indicated by the arrows;

Fig. 7 is a sectional elevation taken on line 7—7 of Fig. 5 and looking in the direction indicated by the arrows;

Fig. 8 is a sectional elevation taken on the line 8—8 of Fig. 5 and looking in the direction indicated by the arrows;

Fig. 9 is a sectional plan view taken substantially on the line 9—9 of Fig. 5 and looking in the direction indicated by the arrows;

Fig. 10 is a sectional elevation of another form of work holding clamp;

Fig. 11 is a sectional elevation taken substantially on the line 11—11 of Fig. 10 and looking in the direction indicated by the arrows;

Fig. 12 is a sectional elevation taken substantially on the line 12—12 of Fig. 10 and looking in the direction indicated by the arrows; and Fig. 13 is a sectional elevation taken substantially on the line 13—13 of Fig. 10 and looking in the direction indicated by the arrows.

In order to aid in an understanding of the invention, before describing the clamp in detail, the main parts and arrangement will be pointed out first. Thus, referring to Figs. 1, 2 and 3, the machine in general comprises a pedestal consisting of the bottom member $P^b$ of sheet metal in the form of a hollow frustrum of a pyramid, a hollow top member $P^t$ rigidly secured to, and supported on the top of, said bottom member in any suitable manner, as by bolts 49, a table T disposed above said top member and means carried by said top member and indicated in general by the reference letter E to raise and lower said table. Mounted to cooperate with work on the table is the saw assembly indicated in general by S, consisting in general of the saw 191, driven pulley 183, grinding wheel 186, and bearings for the assembly. Located within the pedestal and more particularly within the bottom member $P^b$ is a motor M having a driving pulley D designed to drive the saw assembly by means of the belt B. It will be noted that this drive is wholly enclosed. The table T, as shown in Fig. 2 is L-shaped in plan and comprises the large rectangular portion T' and smaller portion $T^2$. A third portion or auxiliary table $T^3$ is pivoted on a pin 50 secured to the underside of the table portion T' by a bracket 51. This pivoted table portion $T^3$, at its front end rests on the top of the bearing of the saw assembly and when the table is raised sufficiently, this portion $T^3$ drops into position flush with the table proper. As shown in Fig. 1, the saw is provided with a guard G which is pivoted on the pin 50 for swinging movement to the rear completely out of the way. The drive pulley belt is provided with a guard G' and a grinding wheel with a guard $G^2$.

The main portion T' of the table is formed with a slot or guideway 52 parallel and adjacent to the cutting plane of the saw. In this guideway is disposed a slide 53 on which is mounted the work holding clamp indicated in general by the reference letter W. At the front end of the slide 53 a pica gauge assembly L is rigidly secured extending at right angles to the length of the slide. The work is adapted to be clamped between the bar of the pica gauge and the work holding clamp W.

At the right of the portion $T^2$ of the table and slightly below the same is a utility box U open at the right hand side to provide a bin for accessories and tools. The top of this box is in the form of a tray U' for unfinished work, etc. A switch J for controlling the operation of the machine may be mounted at the front of the box.

Within the pedestal is provided a large chip box C. Chips collect in this box and may be discharged by gravity into a utensil or truck when the sliding door C' is raised.

The motor M is attached to the underside of a bracket 54 which is pivoted on a rod 55 carried by the pedestal, so that the weight of the motor tends to keep the belt B tight.

Any suitable mechanism E may be provided for raising and lowering the table.

The novel work holding clamping device and its cooperative relation to the various working and gauging devices comprising the composing room saw will now be described. A detailed disclosure of the pica gauge device with which the novel work holding clamp cooperates is described in my copending application Serial No. 130,604, and reference may be had to this application for a more complete disclosure of this device than that set forth below.

Referring to Figs. 1 to 3, 7 and 8, inclusive, the pica gauge comprises a bar 68 rigidly secured, as by means of the pins 69, to the front end of the slide 53 in such manner that the bar rests on the top surface of the table and is slidable thereon together with the slide 53. The bar 68 is formed with a recess extending substantially throughout the length of the bar and open at its front side and the end opposite the slide 53. Slidably disposed within this recess is a gauge rack 71 having rack teeth facing the open forward side of the recess. These teeth have a pitch a multiple of a "point", the unit of the printer's system of measurement. The left hand end of the gauge rack, as viewed in Fig. 3 is threaded and has a point gauge wheel 72 thereon disposed between the end of the gauge bar 68 and the collar 73 integral with the bracket 74 secured to the underside of the end portion of the gauge bar. The gauge wheel 72 may be provided with graduations cooperating with a fixed index and indicating the subdivisions of one revolution of the wheel 72, it preferably being graduated into 12 divisions or points.

Mounted for sliding movement on the gauge bar is the pica gauge 78. As shown, it comprises a body portion 79 having a recess in the bottom thereof adapted to straddle the gauge bar 68 and slidable thereon. The body 79 has an extension 81 provided with a work contacting surface 82 extended at right angles to the length of the gauge bar and parallel to the cutting plane of the saw. The gauge as a whole is adjustable along the length of the gauge bar and for the purpose of indicating any setting of the same a pica scale 83 is set into the top of the gauge bar. Means is provided in the body of the gauge cooperating with the rack teeth to lock the gauge at any desired point along the gauge bar. A gauge rack pin 84 is slidably mounted in the body 79 and has teeth at one end cooperating with the teeth of the rack 71. A gauge link 85 is pivoted intermediate its ends in a recess at the front side of the pica gauge body 79 and has one end in operative engagement with the rack pin 84. The opposite end of the link is in operative engagement with the slidable gauge knob 88. This knob is normally pressed outwardly by means of a spring which pressure through the link tends to hold the rack pin 84 in engagement with the rack 71. To disengage the rack pin from the teeth of the rack the gauge knob 88 is pushed inwardly against the resistance of the spring.

To cut rules or the like to any desired length, the gauge 78 is set with its right hand edge coinciding with the desired length as indicated by the pica scale 83, by depressing the gauge knob 88 and moving the pica gauge to the desired setting then releasing the knob so that the gauge will be locked to the gauge rack. If the setting involves less than a pica, then the gauge wheel 72 is turned one way or the other to give the fractional or "point" setting. The gauge wheel is yieldingly held in the adjusted position by a suitable spring pressed detent. The work is placed against the rear face of the gauge bar with the left hand ends thereof abutting the work contacting surface 82 of the gauge and clamped in this position by moving the clamp plate 91 to clamp the work between the latter and the gauge bar. The slide together with the parts connected therewith and the work is then moved so that the work comes in contact with the saw and is cut to length thereby.

One form of work holding clamp which comprises an essential part of the present invention is illustrated in Figs. 7 to 12 inclusive.

The essential features of this clamping device are its ability to clamp material to be sawed and trimmed such as rules, slugs, plates, type etc., of various widths without previous adjustments thereon to accommodate various thicknesses and to lock them noiselessly and securely in position and also unlock them through the movement of a single control handle operated by one hand only. The clamp may be positively locked to the slide 53 at any point along the same, not being dependent on a rack or teeth or the pitch thereof.

As previously explained, the pica gauge bar 68 is rigidly secured to the front end of the slide 53 at right angles thereto, in any suitable manner as by means of the pins 69. The rear surface of the gauge bar constitutes an abutment against which the work to be cut to length is clamped. The other side of the work is engaged by the end of the clamp plate 91 so that the work is held against said gauge bar. The device for actuating the clamp plate and locking it includes a block 99 formed with two parallel flanges 100 and 101 projecting from its bottom surface and disposed in the longitudinal recesses 102 and 103 formed in the sides of the slide 53. This block is fastened in position by the stud 104, washer 105 and nut 106. The square rod 107 parallel to slide 53 fits into the block 99 and is secured thereto by a nut 108 on the threaded end 109 thereof. The inverted U-shaped clamp block 110 fits over the square rod 107 and the clamp lock plate 111 is secured to the block by the pins 112 and 113, forming a square opening in the block to permit the latter to slide freely along the rod 107. Means is provided to lock the block and the structure movable therewith in a fixed position relative to the slide, the rod 107 in effect constituting a part of the slide as far as the effect of the locking device is concerned.

In the form illustrated, the clamp lock plate is adapted to be locked against movement relative to the slide 53 by a roller clutch mechanism. The lock plate 111 is formed with a wedge-shaped recess 114. Within this recess is a roller 115 normally forced toward the shallow portion of the recess by spring 116 acting at one end against the roller 115 and at the other against a plate 117 fastened to the lock plate 111 by the screws 118. Spaced from the end of the lock plate 111 is a clamp spring block 119 to which is removably secured the clamp plate 91 as by the pins 120. In the upper part of the spring block there is provided a recess for the square rod 107 as clearly shown in Figs. 7 and 11. At its front end or the end adjacent the work, the clamp plate 91 is thickened as by a short plate 91ª pinned to its side by the pins 91ᵇ and both plates are formed with the transverse slot 91ᶜ.

The spring block is formed with a bore 121 open at its right hand end. A yoke 122 is disposed in the space between the adjacent ends of the spring block 119 and the lock plate 111 and formed with a collar 123 fitting and slidable in the bore 121 and having a pin extension 124 projecting through the end of the spring block 119 and having a nut 125 threaded on its projecting end. A spring 126 has one end reacting against the spring block 119 tending to force it toward the left as viewed in Fig. 8 and the other end acting against collar 123 tending to force the yoke 122 toward the right as viewed in said figure. On the side opposite the spring block the yoke 122 is provided with a pin 127 adapted to push the roller 115 to the deeper part of the recess when the yoke 122 is moved toward the right. The yoke and associated parts are actuated by a wrist pin or crank 128 engaging in the yoke and eccentrically carried by a yoke pin 129 rotatively mounted in and projecting from the side of the lock block 110. A handle 130 has a knob 131 at one end and its other end 132 extends through a transverse opening 133 in the projecting portion of the yoke pin 129. When the handle 130 is swung to the left as viewed in Fig. 5 its movement in such direction is limited by the lower protruding end of the handle striking against the head 112ª of pin 112.

It will be seen that the lock plate 111, spring block 119 and associated parts constitute a structure movable as a unit and slidable with respect to the slide and adapted to be locked against movement relative to the slide.

Assuming that the clamp or unitary structure is in its rearmost position and some work is to be clamped to be operated upon, the handle 130 will then be in the unlocked position indicated in dotted lines in Fig. 7. The operator places the palm of his left hand on the knob 131 and while exerting a slight downward pressure on the knob, the clamp is pulled towards the operator, that is toward the gauge bar 68 without turning the handle from the dotted position shown in Fig. 4, until the clamp plate 91 contacts the work which has been placed against the gauge bar 68. Then a final turning of the handle 131 toward the operator permits the roller 115 to move to locking position in the recess 114 whereby the clamp is locked against movement relative to the slide. Turning the handle 130 also moves the yoke 122 toward the left as viewed in Fig. 8 thereby compressing the spring 126 in the spring block 119 and applying pressure through the clamp plate 91 to the work. To unclamp the work, the handle is turned in the reverse direction and then force applied thereto moves the entire clamp mechanism to the rear and away from the work.

Figs. 10 to 13 inclusive, illustrate another form of work holding clamp which is somewhat simpler than the first described form. Referring to these figures, the slide 53ª is I-shaped in cross section, the bottom width being somewhat greater than the top width. This slide is adapted to slide freely in the slot 52 of the table.

The design of this form of work holding clamp embodies the same principles as the previously described form but positions the lock clutch so that it cooperates directly with the slide 53ª, thereby eliminating the square rod 107 of the other form.

Referring to the drawings the clamp lock block is made in two halves 140 and 141 formed at their lower portions to dovetail into the slide 53ª as indicated at 142 and 143. The two halves are held together and clamped to hold the lock plate 144 by the screws 145 and 146. In the lower portion of the lock plate is formed a wedge-shaped recess 147 and disposed therein is the clamping roller 148 normally pressed toward the shallow part of the recess by a spring 149 acting at one end on the spring plug 150 in contact with the roller and at the other end against the spring support 151 fastened to the lock plate by the cap screws 152. The depth of the shallow part of the recess is such that when the roller is in the shallow portion the device is locked against movement relative to the slide, the roller being wedged against the wear plate 153 set into the top of the slide flush with its upper surface. At the left of the lock block is the spring block 154 having a recess in one side to receive the clamp plate 155 removably secured to the spring block by the pins 156. At its end adjacent the work the clamp plate is thickened as by a short plate 157 pinned to its side by the pins 158 and both plates are formed with the transverse slot 159 to receive pin 314ª on gauge block 314.

The lock block overhangs the lock plate 144 providing a recess in which is disposed the yoke 160 having an integral pin extension 161 slidable in the bore 162 of the spring block 154. The end portion of this pin 161 is reduced and projects from the block 154 having a stop-nut 163 threaded on its protruding end. A spring 164 tends to force the yoke 160 toward the right as viewed in Fig. 13. The yoke 160 acts against a roller release pin 165 which contacts the roller 148 and moves it to the deeper part of the recess 147 when the yoke is moved toward the right as viewed in Fig. 13.

Movement of the yoke is effected by the eccentric wrist pin 166 disposed within the yoke and carried by the shaft 167 rotatively mounted in the lock block and projected from one side thereof. A handle 130 projects through an aperture in the shaft 167 to rotate the latter and through the eccentric pin 166 slides the yoke 160. The extent of the rotation of the handle toward the left as viewed in Fig. 10 is limited by the protruding end 168 striking the head 169 of the screw 146. The protruding end of screw 145 carries a roller 170 running on the top of the table and serving to eliminate some of the friction between the slide and the table.

The operation of this work holding clamp is similar to that shown in Fig. 7.

Having thus described the invention, what is claimed as new and desired to be secured by Letters Patent is:

1. A machine of the character described including in combination, a table having a slot formed therein, a saw adapted to cut in a plane parallel and adjacent to said slot, a slide slidable in said slot, an abutment rigid with said slide and means to clamp work to be operated on by said saw against said abutment comprising a structure movable as a unit and slidable on said slide and having a member adapted to contact the work on the side thereof opposite said abutment, means to yieldingly force said member against the work and hold the member against retrograde movement including a clamp lock plate associated with said structure having a wedge-shaped recess, means to lock said plate against movement relative to said slide including a roller in said recess and yielding means forcing said roller toward the shallow part of said recess.

2. A work holding clamp including in combination, a slide, a device movable as a unit along said slide and including a lock plate formed with a wedge-shaped recess having an open side closed by said slide, a roller in said recess, a spring forcing said roller toward the shallow part of said recess to lock said plate against movement relative to the slide, means adapted to yieldingly contact the work, and means to relieve said yielding means and unlock said roller from locking position.

3. A work holding clamp including in combination, a slide, a structure movable as a unit along said slide and including a clamp block having a wedge-shaped recess, a roller interposed between the inclined surface bounding said recess and the slide, a spring forcing the roller to the shallow part of the recess to lock the block to the slide, a part adapted to contact the work, a yoke member, a spring between one end of said member and said part, a pin between the other end of said member and said roller, a handle mounted for limited angular movement provided with an eccentrically disposed pin engaging said yoke, whereby when said handle is turned in one direction said part is yieldingly forced against the work and the roller forced into locking position by its spring, and when turned in the other direction said part is relieved and the roller unlocked.

4. A work holding arrangement of the class described comprising, in combination, a base having a relatively fixed abutment thereon, a slideway on said base, a clamping structure adapted to move as a unit along said way and including a work contacting element and resilient means disposed between said element and the main portion of said structure whereby the work may be yieldingly clamped against said abutment, a wedging roller clutch for locking said structure to said way in work clamping position, and a single means for unlocking said clutch and for relieving the resilient pressure on said work contacting element.

5. A work holding device of the class described, comprising, in combination, a base, an abutment rigid with said base, and means to clamp the work to be operated on against said abutment, said means comprising a structure movable as a unit and slidable along said base and having a member adapted to contact the work on the side thereof opposite said abutment, means to yieldingly force said member against the work and hold the member against retrograde movement including a clamp lock plate associated with said structure having a wedge-shaped recess, means to lock said plate against movement relative to said base including a roller in said recess and yielding means forcing said roller toward the shallow part of said recess.

6. A work holding clamp including in combination, a guide member, a device movable as a unit along said guide member and including a lock plate formed with a wedge-shaped recess having an open side closed by said guide member, a roller in said recess, a spring forcing said roller toward the shallow part of said recess to lock said plate against movement relative to the guide member, means adapted to yieldingly contact the work, and means to relieve said yielding means and unlock said roller from locking position.

FREDERICK W. SEYBOLD.